Aug. 29, 1939.  M. V. GILSON  2,171,030
AUTOMOBILE TRUCK
Filed Feb. 11, 1938  2 Sheets-Sheet 1

Inventor
Michael V. Gilson

Aug. 29, 1939.　　　M. V. GILSON　　　2,171,030
AUTOMOBILE TRUCK
Filed Feb. 11, 1938　　　2 Sheets-Sheet 2
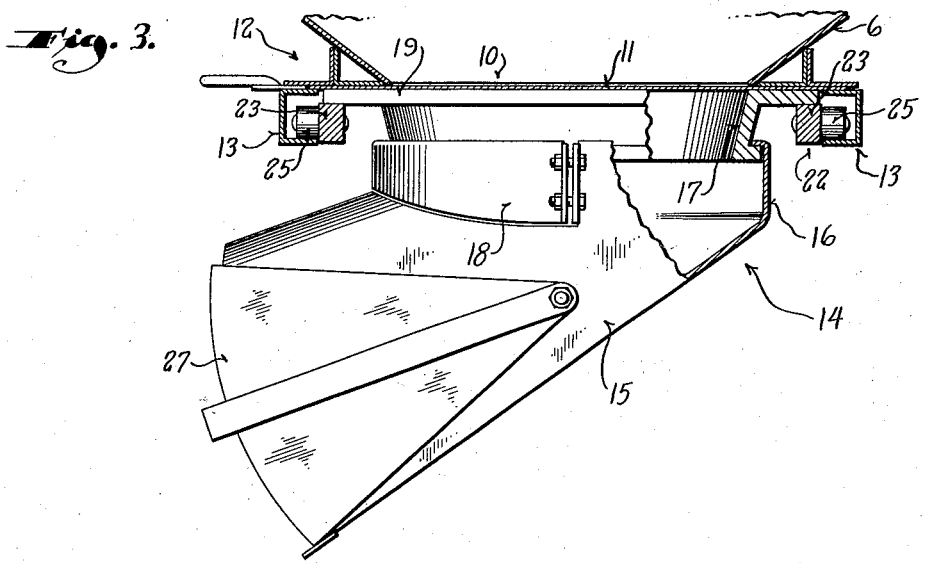
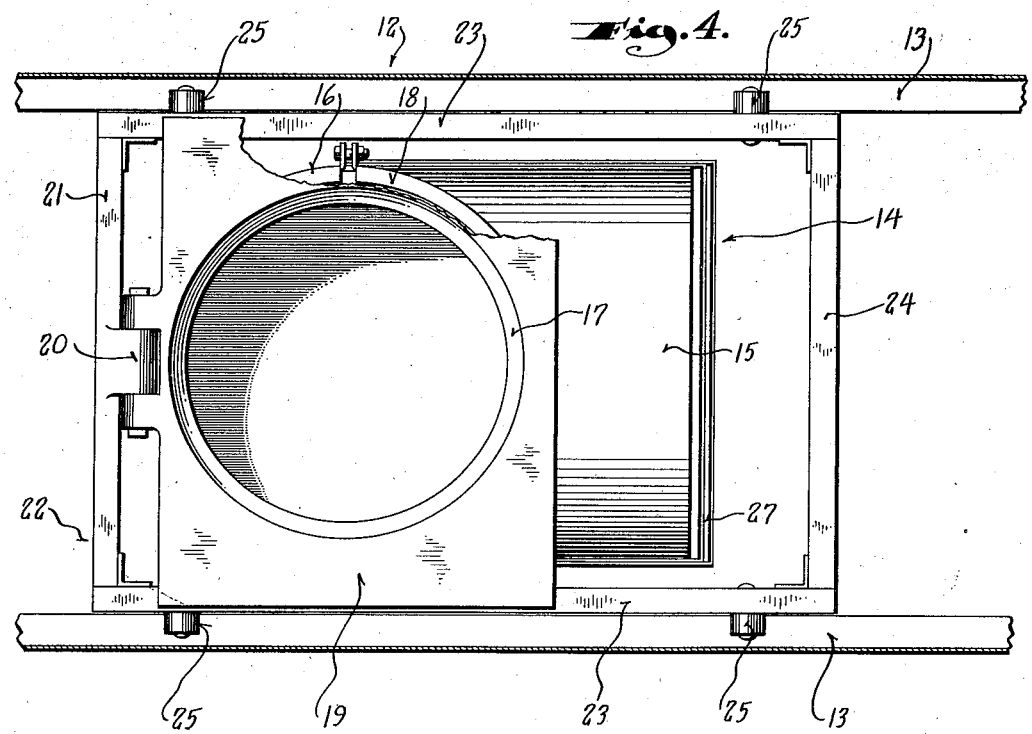

Patented Aug. 29, 1939

2,171,030

UNITED STATES PATENT OFFICE 2,171,030

AUTOMOBILE TRUCK

Michael V. Gilson, Fredonia, Wis., assignor to Gilson Brothers Company, Fredonia, Wis., a corporation of Wisconsin Application February 11, 1938, Serial No. 190,014

7 Claims. (Cl. 298—7)

This invention relates to automobile trucks, and like Patent No. 2,079,345, issued May 4, 1937, refers particularly to truck bodies of the type adapted to be bodily elevated for convenience in discharging their contents.

The aforesaid patent provides a construction whereby the overall height of the truck when the body is lowered to its traveling position is reduced while at the same time each of the several compartments into which the body is divided may be readily emptied. This broad object is attained in the patent by providing a discharge chute slidably supported under the body for movement longitudinally of the body into alignment with the discharge port of any one of the several compartments.

With this past construction, upon lowering of the body, the discharge chute hung down into the chassis of the truck and to permit the body to be lowered as far as possible, the chute was made collapsible. While this construction has proved satisfactory in most instances, there have been cases where the truck chassis was so constructed that its transverse obstructions would not permit the discharge chute to hang into the chassis any great extent.

The present invention therefore has as its object to improve the construction of truck bodies of the character described, to the extent of obviating the necessity of having the discharge chute hang down into the chassis of the truck or of having the discharge chute collapse.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawings illustrate one complete example of the physical embodiment of the invention constructed in accordance with the best mode so far devised for the practical application of the principles thereof, and in which:

Figure 3 is a transverse sectional view taken through Figure 1 on the plane of the line 3—3; and Figure 4 is a top plan view of the chute structure per se.

Figure 1:
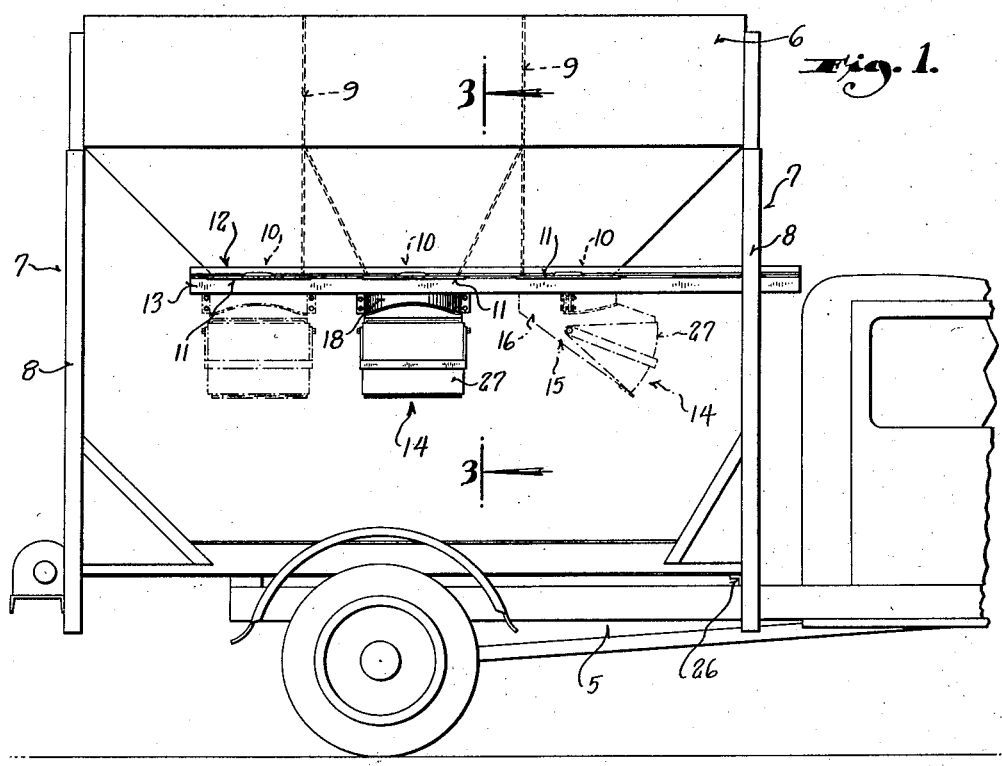
Figure 1 is a side view showing the rear portion of a truck equipped with a body constructed in accordance with this invention, and showing the body in its elevated unloading position.

Referring now particularly to the accompanying drawings in which like numerals indicate like parts, the numeral 5 designates an automobile truck chassis of any conventional construction upon which a body 6 is mounted by means of a supporting framework 7. The framework 7 includes four uprights 8 which guide the body 6 for movement from a lowered traveling position, shown in Figure 2, to an elevated discharging position, shown in Figure 1, and vice versa.

The mechanism for raising and lowering the truck body 6 forms no part of this invention, and therefore has not been shown.

The truck body 6 is divided by partitions 9 into a plurality of separated compartments having converging lower walls leading to discharge ports 10 so that each compartment has its own discharge port. These discharge ports are closed by sliding gates or doors 11 carried by and guided for movement to and from closed position by a frame, indicated generally by the numeral 12, which is secured to the bottom of the body, as shown.

The frame 12 also provides two spaced longitudinal rails or tracks 13 which extend along the entire length of the bottom of the body and project forwardly thereof for a purpose to be hereinafter described. While the specific construction of these rails or tracks may be varied, it has been found desirable to form them of channel irons and to mount them with their inside faces directed inwardly.

Slidably supported by the rails or tracks 13 is a discharge chute, indicated generally by the numeral 14. The discharge chute 14 being slidably supported by these tracks may be moved longitudinally of the body into alignment with the discharge port of any one of the several compartments so that any one of the compartments may be emptied without disturbing the contents of the others.

The discharge chute 14 consists of a chute proper 15 having a cylindrical neck 16 which embraces the lower flanged end of a collar 17 so that the chute is capable of being rotated about a vertical axis to permit discharging the material to either side of the truck. The assembly of the chute 15 with the flanged collar is conveniently accomplished by having one half of its cylindrical neck formed by a separate semicircular part 18 which is bolted to the main part of the chute.

The collar 17 has an integral diameter of a size comparable to that of the discharge ports 10 and is so positioned with respect thereto that the top plane of the collar which is formed by a substantially rectangular plate 19 passes just below the gates or doors 11 so that when a gate or door is opened, the contents of its compartment flow directly through the collar and into the chute.

The rectangular top flange 19 of the collar has one transverse edge thereof hingedly connected as at 20 to a transverse rail 21 of a carriage 22. The carriage 22 consists of a rectangular frame formed by the transverse rail 21, two side rails 23, and another transverse rail 24. These rails are securely connected together to form one rigid unit, the width of which is less than that of the horizontal top flange 19 so that the top flange rests on top of the side rails 23.

The carriage is mounted to run along the tracks 13 by rollers 25 journalled on studs fixed to the side rails 23.

Figure 2:
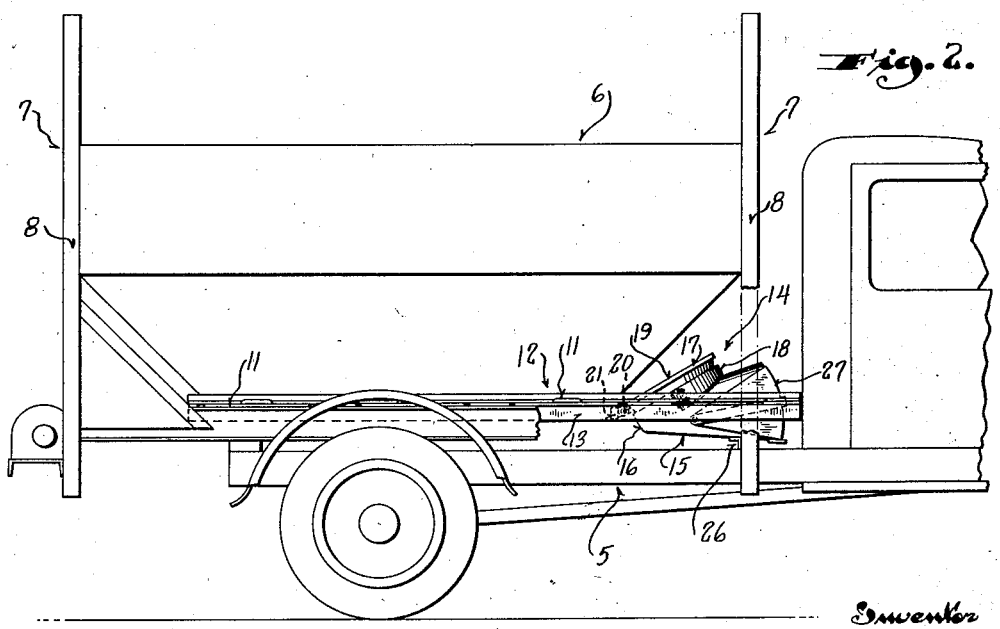
Figure 2 is a view similar to Figure 1, but illustrating the body lowered to its traveling position.

It is thus apparent that the discharge chute structure is freely positionable under any selected compartment, and by virtue of the forward extension of the tracks 13, may be run forwardly of the front compartment of the body to permit it to be swung upwardly on the hinge 20 to occupy the space between the back of the truck cab and the inclined lower front wall of the truck body, as clearly shown in Figure 2. This permits the truck body to be lowered as far as possible without regard for the discharge chute and does not necessitate having any part of the chute hang down into the chassis of the truck.

While some part of the truck chassis may be used as a support to engage the bottom of the chute and cause it to hinge upwardly upon lowering of the body, it is preferable to provide a transverse rail 26 on the framework 7 in position to engage the chute bottom as the body is lowered.

It is obvious, of course, that the dimensions of the frame constituting the carriage 23 which does not tilt but remains on the horizontal tracks, are such that the entire chute structure, including a gate 27, may move up through the carriage.

From the foregoing description taken in connection with the accompanying drawings, it will be readily apparent to those skilled in the art that this invention enables the truck body to be lowered further than has been possible heretofore in constructions of the character described, and that this desirable feature is attained without necessitating having any portion of the discharge chute hang down into the chassis of the truck; and that the movement of the discharge chute into the space it occupies when the truck body is in its lowered traveling position and also its return to operative position, is effected entirely automatically as an incident to the lowering and raising of the body.

Furthermore, as will be readily apparent, the invention is also advantageous in single compartment truck bodies inasmuch as differences in chassis design preclude choice of the point at which the discharging chute may be lowered, and swinging the chute upwardly onto one of the side walls obviates this consideration.

What I claim as my invention is:

1. In combination with an automobile truck having a chassis: a hopper body divided into a number of separate compartments, each of which has its own discharge port at the bottom thereof; means mounting the body from the chassis for movement between an elevated unloading position and a lowered traveling position at which the discharge ports lie close to the chassis; a single discharge chute; and means mounting the discharge chute from the body for movement longitudinally of the body into alignment with the discharge port of any one compartment and to a position beyond one end of the body and into a space lying above the chassis of the truck so as to enable complete lowering of the body onto the chassis without regard for special space provision for the discharge chute between the body and the chassis.

2. In combination with an automobile truck having a chassis and a cab: a hopper body divided into a plurality of separate compartments, each of which has its own discharge port; means for mounting the body from the chassis for movement between an elevated unloading and a lowered traveling position, one end of the body being closely adjacent to the back of the cab when the body is lowered and said end of the body having its lower portion sloping away from the cab so that the sloping wall of said end of the body and the cab define substantially a triangular space; a single discharge chute; and means for movably supporting the discharge chute from the bottom of the body to enable the same to be moved longitudinally into alignment with the discharge port of any compartment and to a position positionable in the triangular space between the cab and the adjacent end of the body so that complete lowering of the body onto the chassis may be effected without special space provision for the discharge chute between the body and the chassis.

3. In an automobile truck construction of the character described: a hopper body mounted for vertical movement; partitions dividing the hopper body into a plurality of separate compartments, each of which has its own discharge port; a supporting track carried by the lower portion of the body and extending longitudinally thereof with one end projecting beyond the adjacent end of the body; a single discharge chute; and means for suspending said discharge chute from the track to enable movement of the chute under the discharge port of any compartment and beyond said end of the body, and said connection including, a hinge whereby the discharge chute may be swung upwardly when supported by that part of the track which extends beyond the body.

4. In an automobile truck of the character described: a hopper body having a plurality of discharge ports in the bottom thereof; track means carried by the body and extending past all of said discharge ports and beyond one wall of the body; a carriage movable along said track means; a discharge chute; a hinged connection between the discharge chute and the carriage; and means cooperating with the hinged connection to support the discharge chute in a pendent position from the carriage while enabling the discharge chute to be swung upwardly with respect to the carriage and the track means whereby the discharge chute is positionable under any one of the discharge ports and swingable upwardly toward the wall of the body beyond which the track means extends.

5. In combination: a hopper type truck body having a plurality of discharge ports in its bottom arranged longitudinally of the body and having an inclined end wall; track means extending longitudinally of the body and extending beyond the bottom of said inclined end wall so that said track means and the inclined end wall form two sides of a triangular space; a single discharge chute; and means for suspending the discharge chute from the track means to enable the discharge chute to be positioned under any selected discharge port, said last named means including, a hinge connection enabling the discharge chute to be swung upwardly into said triangular space defined between the inclined end wall of the body and said track means.

6. In combination: a hopper type truck body having a discharge port in its bottom with sloping walls leading thereto; track means carried by the lower part of the body and extending beyond the bottom edge of one of said sloping walls so that said sloping wall and the projecting end portion of the track means form two sides of a triangular space; a discharge chute; and means for movably suspending the discharge chute from the track means for movement between a position under the discharge port and a position beyond said sloping wall, said last named means including a hinge connection which enables the discharge chute to be swung upwardly into said triangular space defined between said sloping wall of the body and said projecting end portion of the track means.

7. In combination with an automobile truck having a chassis: a hopper having a discharge port at its bottom and sloping walls leading thereto; means mounting the body from the chassis for movement between an elevated unloading position and a lowered traveling position at which the discharge port lies close to the chassis; a discharge chute; and means mounting the discharge chute from the body for movement into alignment with the discharge port and to a position beyond one sloping wall of the body into a space lying above the chassis of the truck so as to enable complete lowering of the body into the chassis without regard for special space provision for the discharge chute between the body and the chassis.

MICHAEL V. GILSON.